United States Patent
Noui-Mehidi et al.

(10) Patent No.: US 10,900,353 B2
(45) Date of Patent: Jan. 26, 2021

(54) METHOD AND APPARATUS FOR SUB-TERRAIN CHLORINE ION DETECTION IN THE NEAR WELLBORE REGION IN AN OPEN-HOLE WELL

(71) Applicant: Saudi Arabian Oil Company, Dhahran (SA)

(72) Inventors: Mohamed Nabil Noui-Mehidi, Dhahran (SA); Ilies Mostefai, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 19 days.

(21) Appl. No.: 16/133,127

(22) Filed: Sep. 17, 2018

(65) Prior Publication Data

US 2020/0088029 A1   Mar. 19, 2020

(51) Int. Cl.
*E21B 49/10* (2006.01)
*G01V 3/30* (2006.01)
(Continued)

(52) U.S. Cl.
CPC ............... *E21B 49/10* (2013.01); *G01V 3/30* (2013.01); *H01Q 1/04* (2013.01); *H01Q 1/24* (2013.01);
(Continued)

(58) Field of Classification Search
CPC ............ G01V 3/30; G01V 2210/62; E21B 2049/085; E21B 49/10; H01Q 1/04; H01Q 1/24
(Continued)

(56) References Cited

U.S. PATENT DOCUMENTS 5,006,785 A    4/1991  Revus et al.
5,132,623 A *  7/1992  De ..................... H01Q 9/0414
                                              324/338
(Continued)

FOREIGN PATENT DOCUMENTS

EP    2644822 B1       4/2016
EP    3084481 A2 * 10/2016  ................ H02J 7/00
(Continued)

OTHER PUBLICATIONS

Ostrowskiness. Chloride and Salinity. www.ostrowskiness.com. Sep. 2011. (Year: 2011).*
(Continued)

*Primary Examiner* — Patrick Assouad
*Assistant Examiner* — Sean Curtis
(74) *Attorney, Agent, or Firm* — Bracewell LLP; Constance G. Rhebergen; Linda L. Morgan

(57) ABSTRACT

Methods and systems for identifying a salinity gradient in a formation surrounding a bore of a subterranean well includes introducing an antenna assembly into the bore of the subterranean well. The antenna assembly has an elongated antenna body. An emitting antenna extends axially along an outer surface of the antenna body. A receiving antenna extends axially along the outer surface of the antenna body, the receiving antenna being spaced circumferentially apart from the emitting antenna. An electromagnetic interrogation wave is produced into the formation with the emitting antenna with a pulse duration of no greater than 0.01 seconds. A reflected wave is received with the receiving antenna. The amplitude of the reflected wave is analyzed to determine a distribution of chlorine ion concentration in the formation.

26 Claims, 2 Drawing Sheets

(51) Int. Cl.
*H01Q 1/04* (2006.01)
*H01Q 1/24* (2006.01)
*E21B 49/08* (2006.01)

(52) U.S. Cl.
CPC ...... *E21B 49/0875* (2020.05); *G01V 2210/62* (2013.01)

(58) Field of Classification Search
USPC ............... 324/338, 533–534, 637, 642, 646
See application file for complete search history.

(56) References Cited

U.S. PATENT DOCUMENTS

| | | | |
|---|---|---|---|
| 6,788,219 B2 * | 9/2004 | Sun .................... | G01V 11/002 329/313 |
| 7,098,858 B2 * | 8/2006 | Bittar .................. | H01Q 7/08 343/719 |
| 7,348,781 B2 * | 3/2008 | Tabanou ............... | G01V 3/30 324/332 |
| 7,363,160 B2 | 4/2008 | Seleznev et al. | |
| 7,476,829 B2 * | 1/2009 | Kingman ............. | B02C 19/18 219/678 |
| 7,839,346 B2 * | 11/2010 | Bittar .................. | H01Q 1/04 343/719 |
| 7,893,692 B2 | 2/2011 | Minh | |
| 8,928,322 B2 | 1/2015 | Montaron | |
| 9,085,959 B2 * | 7/2015 | Bittar .................. | G01V 3/30 |
| 9,341,053 B2 * | 5/2016 | Donderici ........... | G01V 11/00 |
| 9,879,519 B2 * | 1/2018 | Roberson ............ | E21B 47/10 |
| 9,903,199 B2 | 2/2018 | Clarke | |
| 10,132,953 B2 * | 11/2018 | Hartmann ............ | G01V 3/20 |
| 10,563,501 B2 * | 2/2020 | Cooley ................ | E21B 41/0085 |
| 2004/0100393 A1 * | 5/2004 | Sun .................... | G01V 11/002 340/855.4 |
| 2005/0212520 A1 | 9/2005 | Homan et al. | |
| 2006/0145700 A1 * | 7/2006 | Tabanou .............. | G01V 3/30 324/347 |
| 2013/0154846 A1 | 6/2013 | Mangione et al. | |
| 2014/0251598 A1 * | 9/2014 | Filatyev .............. | E21B 43/2401 166/248 |
| 2014/0367092 A1 * | 12/2014 | Roberson ............. | E21B 47/01 166/250.01 |
| 2015/0285057 A1 * | 10/2015 | Donderici ........... | G01V 11/005 73/152.54 |
| 2016/0033673 A1 | 2/2016 | Liang et al. | |
| 2016/0131601 A1 * | 5/2016 | Sharma .............. | G01N 33/2823 324/642 |
| 2017/0322064 A1 * | 11/2017 | Sharma .............. | G01F 1/66 |
| 2018/0059280 A1 * | 3/2018 | Hartmann ........... | G01V 3/30 |
| 2018/0135408 A1 * | 5/2018 | Cooley ............... | E21B 41/0085 |
| 2019/0204466 A1 * | 7/2019 | Zhang ................. | G01V 3/34 |
| 2020/0088029 A1 * | 3/2020 | Noui-Mehidi ....... | H01Q 1/04 |

FOREIGN PATENT DOCUMENTS

| | | | | |
|---|---|---|---|---|
| WO | 2015015215 A1 | 2/2015 | | |
| WO | WO-2015095858 A2 * | 6/2015 | ......... | E21B 41/0085 |

OTHER PUBLICATIONS

Peinado-Guevara et al., Relationship between Chloride Concentration and Electrical Conductivity in groundwater and its estimation from vertical electrical surrounding (VESs) in Guasave, Sinaloa, Mexico. Cienc. Inv. Agr. vol. 39, No. 1, Sanitago. abr. 2012 (Year: 2012).*
International Search Report and Written Opinion for related PCT application PCT/US2019/051261 dated Jan. 7, 2020.
Enhunen et al , "Impulse Method to Calculate the Frequency Response of the Electromagnetic Forces on whirling cage rotors," IEE Proc.-Electr. Power Appl., vol. 150, No. 6, pp. 752-756, Nov. 2003.

* cited by examiner

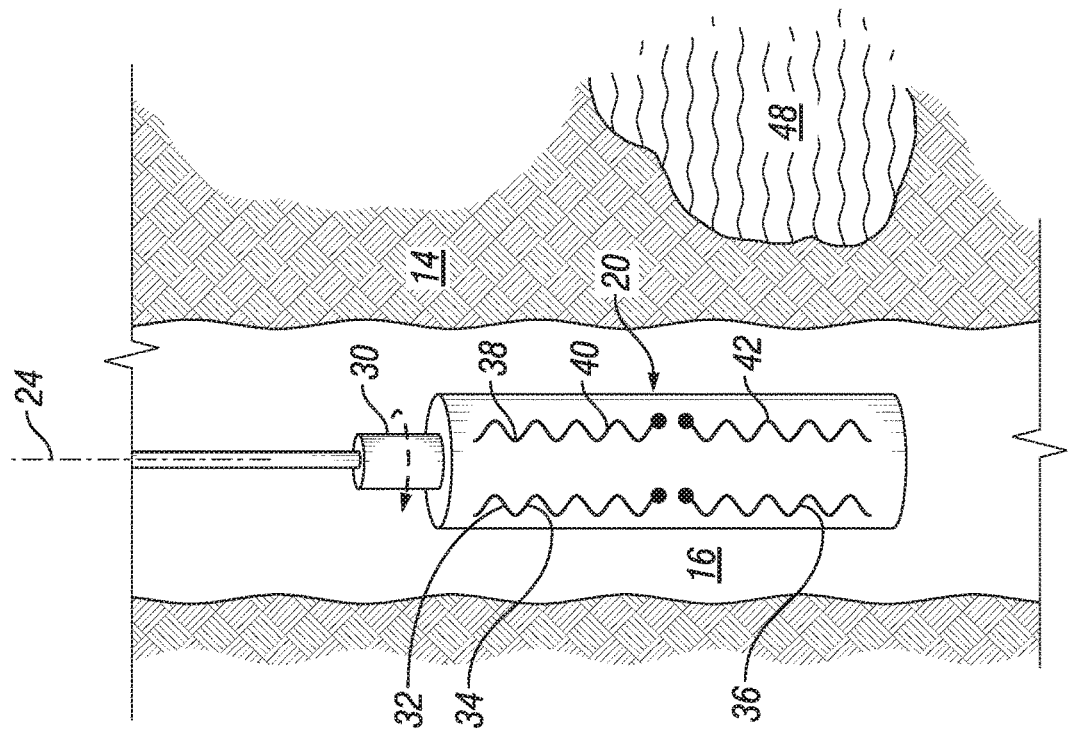
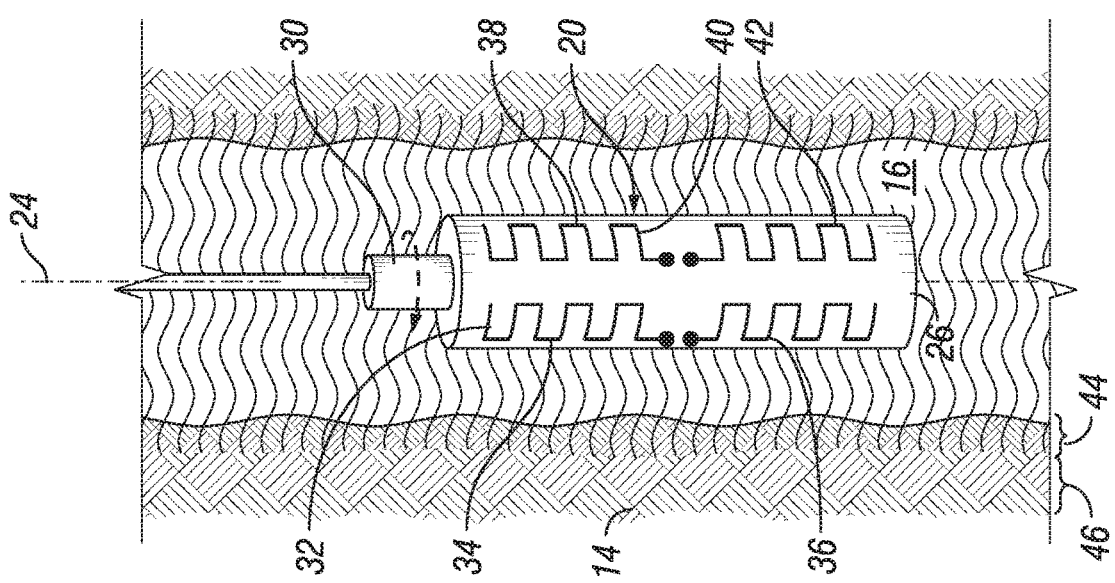

METHOD AND APPARATUS FOR SUB-TERRAIN CHLORINE ION DETECTION IN THE NEAR WELLBORE REGION IN AN OPEN-HOLE WELL

BACKGROUND

1. Field of the Disclosure

The present disclosure relates to imaging sub-surface fluids, and more particularly to identifying a salinity of a fluid in a formation surrounding a bore of a subterranean well.

2. Description of the Related Art

Water front monitoring and formation saturation measurements are fundamental aspects of subterranean formation logging practices. As an example, formation saturation measurements can be used to understand the water front movement in the formation, in particular behind the wellbore. In a case where the well is worked over or shut-in, high concentration brine can be used as a kill fluid in the wellbore, such as brine with a salinity greater than 200,000 parts per million (ppm) total dissolved solids. This kill fluid invades the near wellbore region a number of feet away from the wellbore walls. In order to measure the saturation of the fluid in the near wellbore region, the presence of the kill fluid in the invaded near wellbore region can interfere with conventional monitoring methods, such as resistivity measurements, radioactive measurements, and acoustic measurements.

Further, in a situation where formation water is mixed with injection water, such as water injection for reservoir pressure maintenance, there is a gradient in the salinity of the water phase as a result of such mixing. The gradient becomes difficult to discern using conventional monitoring tools such as resistivity or pulsed neutron sensing techniques. The injected water can have a salinity that is less than the salinity of the formation water.

SUMMARY OF THE DISCLOSURE

Embodiments of this disclosure provide systems and methods that are able to differentiate between the near wellbore fluid and the water saturation behind the wellbore. This disclosure describes a method and a tool for the detection and monitoring of a concentration of the chlorine ion that is present in the water phase to differentiate between the injection water and the formation water or to measure saturation in the near wellbore region behind the kill fluid invaded zone.

Systems and methods of this disclosure present a solution for differentiating between the injection water and the formation water or to measure saturation in the near wellbore region behind the kill fluid invaded zone. Systems and methods of this disclosure use electromagnetic waves to detect chlorine ion concentrations based on a measured attenuation of electromagnetic wave amplitudes.

In an embodiment of this disclosure, a method for identifying a salinity gradient in a formation surrounding a bore of a subterranean well includes introducing an antenna assembly into the bore of the subterranean well. The antenna assembly has an elongated antenna body. An emitting antenna extends axially along an outer surface of the antenna body. A receiving antenna extends axially along the outer surface of the antenna body, the receiving antenna being spaced circumferentially apart from the emitting antenna. An electromagnetic interrogation wave is produced into the formation with the emitting antenna with a pulse duration of no greater than 0.1 seconds. A reflected wave is received with the receiving antenna. The amplitude of the reflected wave is analyzed to determine a distribution of chlorine ion concentration in the formation.

In alternate embodiments, the emitting antenna and the receiving antenna can be printed on the outer surface of the antenna body. The emitting antenna and the receiving antenna can have the same shape, and the shape can be non-linear. The emitting antenna and the receiving antenna can each be a dipole antenna with a matching non-linear shape. The receiving antenna can be spaced circumferentially apart from the emitting antenna in a range of 30 to 45 degrees. The length of each antenna can be in a range of 0.3 to 0.5 meters. The emitting antenna can have a power in a range of 15 to 20 volts. The emitting antenna can have a peak to peak load of 50 Ohms and a power range of 4.5 to 8 Watts.

In other alternate embodiments, producing an electromagnetic interrogation wave into the formation with the emitting antenna can include producing the electromagnetic interrogation wave with a frequency in a range of 500 megahertz to 1 gigahertz. The method can further include rotating the antenna assembly around a central axis of the antenna body within the bore of the subterranean well.

In another embodiment of this disclosure, a system for identifying a salinity gradient in a formation surrounding a bore of a subterranean well includes an antenna assembly sized to be introduced into the bore of the subterranean well. The antenna assembly has an elongated antenna body. An emitting antenna extends axially along an outer surface of the antenna body. The emitting antenna is operable to produce an electromagnetic interrogation wave into the formation with a pulse duration of no greater than 0.1 seconds. A receiving antenna extends axially along the outer surface of the antenna body. The receiving antenna is spaced circumferentially apart from the emitting antenna and the receiving antenna is operable to receive a reflected wave. The amplitude of the reflected wave is determinative of a distribution of chlorine ion concentration in the formation.

In alternate embodiments, the emitting antenna and the receiving antenna can be printed on the outer surface of the antenna body. The emitting antenna and the receiving antenna can have the same shape, and the shape can be non-linear. The emitting antenna and the receiving antenna can each be a dipole antenna with a matching non-linear shape. The receiving antenna can be spaced circumferentially apart from the emitting antenna in a range of 30 to 45 degrees. The length of each antenna can be in a range of 0.3 to 0.5 meters. The emitting antenna can have a power in a range of 15 to 20 volts. The emitting antenna can have a peak to peak load of 50 Ohms and a power range of 4.5 to 8 Watts. The electromagnetic interrogation wave can have a frequency in a range of 500 megahertz to 1 gigahertz. A motor can be operable to rotate the antenna assembly around a central axis of the antenna body within the bore of the subterranean well.

BRIEF DESCRIPTION OF THE DRAWINGS

So that the manner in which the recited features, aspects and advantages of the disclosure, as well as others that will become apparent, are attained and can be understood in detail, a more particular description of the embodiments of the disclosure previously briefly summarized may be had by reference to the embodiments that are illustrated in the drawings that form a part of this specification. It is to be noted, however, that the appended drawings illustrate only certain embodiments of the disclosure and are not to be considered limiting of the disclosure's scope, for the disclosure may admit to other equally effective embodiments.

FIG. 2 is a schematic partial-section view of an antenna assembly located within a bore of a subterranean well, in accordance with an embodiment of this disclosure, shown with kill fluid invading a near bore region.

FIG. 3 is a schematic partial-section view of an antenna assembly located within a bore of a subterranean well, in accordance with an embodiment of this disclosure, shown with injection water approaching the bore.

DETAILED DESCRIPTION OF THE DISCLOSURE

Figure 1:
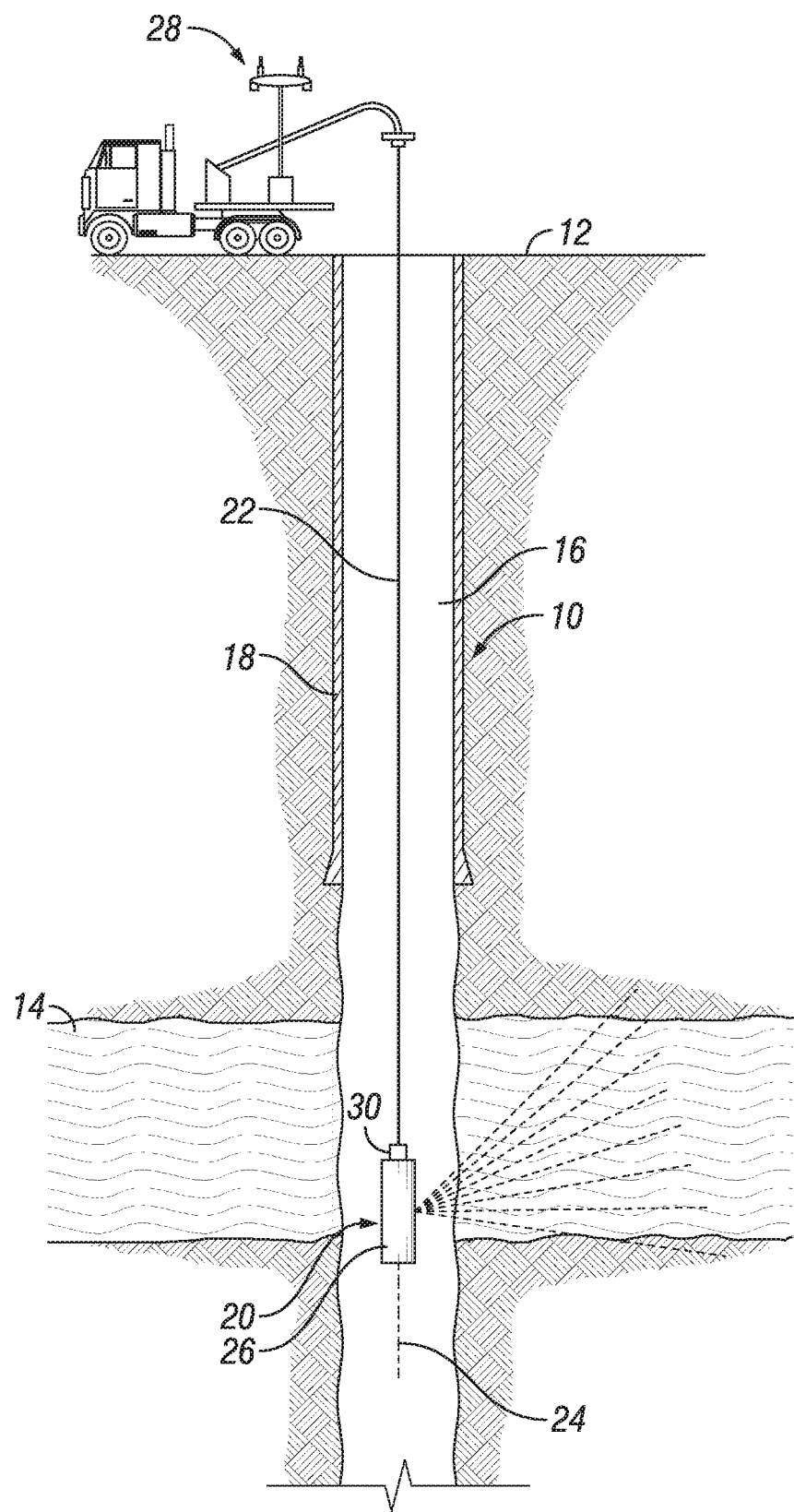
FIG. 1 is a schematic section view of an antenna assembly introduced into a bore of a subterranean well, in accordance with an embodiment of this disclosure.

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Looking at FIG. 1, an embodiment of a system and method for identifying a salinity gradient in a formation surrounding a bore of a subterranean well is shown. Subterranean well 10 can extend from surface 12 through subterranean formation 14. Bore 16 of subterranean well 10 can be lined with casing 18 that extends from surface 12 a distance into subterranean well 10. A downhole portion of subterranean well 10 can be open, without casing 18. Subterranean formation 14 is located along a portion of subterranean well 10 that open and free of casing 18.

Antenna assembly 20 can be used to identify a salinity gradient in subterranean formation 14 surrounding bore 16 of subterranean well 10. Antenna assembly 20 can be sized to be introduced into bore 16 of subterranean well 10. Antenna assembly 20 can be introduced into bore 16 with introducing string 22. Introducing string 22 can transmit electrical energy to antenna assembly 20. Introducing string 22 can additionally transmit data from antenna assembly 20 to control system 28. Control system 28 can control the pulses emitted by antenna assembly 20 and can process data received by antenna assembly 20.

Introducing string 22 can support antenna assembly 20 within bore 16 of subterranean well 10. Introducing string 22 can be, for example, e-coiled tubing or a wireline. In an embodiment, e-coil tubing can be a coiled tubing that has the capability to transmit power, data, or both power and data. Antenna assembly 20 can be rotated by motor 30 around central axis 24 of antenna body 26 within bore 16 of subterranean well 10.

Looking at FIG. 2, antenna assembly 20 includes antenna body 26. Antenna body 26 can be an elongated generally cylindrical member. Emitting antenna 32 extends axially along an outer surface of antenna body 26. Emitting antenna 32 can have a shape that is non-linear. In the example of FIG. 2, emitting antenna 32 has a square shaped pattern. In the example of FIG. 2, emitting antenna 32 is a dipole antenna. Emitting antenna 32 can have an axial length in a range of 0.3 to 0.5 meters. In the example of FIG. 2 uphole emitting antenna element 34 could have an axial length in a range of 0.15 to 0.25 meters and downhole emitting antenna element 36 could have an axial length in a range of 0.15 to 0.25 meters. In alternate embodiments, emitting antenna 32 can be a monopole antenna.

Emitting antenna 32 is printed on the outer surface of antenna body 26. Emitting antenna 32 can produce an electromagnetic interrogation wave directed through bore 16 and into subterranean formation 14. Emitting antenna 32 can produce an electromagnetic interrogation wave with a pulse duration of no greater than 0.01 seconds. In alternate embodiments, emitting antenna 32 can produce an electromagnetic interrogation wave with a pulse duration of no greater than 0.1 seconds, such as an electromagnetic interrogation wave with a pulse duration in a range of 0.01 to 0.1 seconds, to allow for a variation in interrogation modes. Emitting antenna 32 can further produce an electromagnetic interrogation wave that has a frequency in a range of 500 megahertz to 1 gigahertz. Emitting antenna 32 can have a power in a range of 15 to 20 volts at a peak to peak load of 50 Ohms and a power range of 4.5 to 8 Watts. Such characteristics of emitting antenna 32 provide an antenna assembly 20 that is particularly capable of detecting changes in the chlorine ion concentration. In example embodiments, antenna assembly 20 can detect chlorine ion concentrations in a range of 4,000 ppm to 200,000 ppm.

Receiving antenna 38 extends axially along an outer surface of antenna body 26. Receiving antenna 38 can have a shape that is non-linear. In the example of FIG. 2, receiving antenna 38 has a square shaped pattern. In the example of FIG. 2, receiving antenna 38 is a dipole antenna. Receiving antenna 38 can have an axial length in a range of 0.3 to 0.5 meters. In the example of FIG. 2 uphole receiving antenna element 40 could have an axial length in a range of 0.15 to 0.25 meters and downhole receiving antenna element 42 could have an axial length in a range of 0.15 to 0.25 meters. In alternate embodiments, receiving antenna 38 can be a monopole antenna.

Receiving antenna 38 is printed on the outer surface of antenna body 26. Receiving antenna 38 is spaced circumferentially apart from emitting antenna 32. In certain embodiments, receiving antenna 38 is spaced circumferentially apart from emitting antenna 32 in a range of 30 to 45 degrees. Receiving antenna 38 can have the same shape as emitting antenna 32, such shape being a matching non-linear shape.

Receiving antenna 38 can receive a reflected wave. The reflective wave is an electromagnetic wave that is the result of interrogation wave that is passing through bore 16 and into subterranean formation 14 and is reflected in a direction back towards receiving antenna 38.

In the Example of FIG. 2, the interrogation wave passes through invaded zone 44. Invaded zone 44 is a zone surrounding bore 16 where kill fluid has entered subterranean formation 14. Invaded zone 44 can be absent at certain locations along bore 16, and can alternately extend up to about 25 inches radially outward from bore 16. In alternate embodiments, invaded zone 44 can extend two inches to 25 inches radially outward from bore 16. After passing through invaded zone 44, the interrogation wave can enter uninvaded zone 46. Uninvaded zone 46 is a portion of subterranean formation 14 that has not been invaded by the kill fluid. Systems and methods of this disclosure can be used to detect a chlorine ion concentration in both invaded zone 44 and uninvaded zone 46. The chlorine ion concentration gradient can be used to identify the border between invaded zone 44 and uninvaded zone 46. The chlorine ion concentration can also be used to determine the level of saturation in uninvaded zone 46 behind invaded zone 44. As an example, systems and methods of this disclosure can detect chlorine ion concentrations at a radial distance of at least 8 feet from an outer surface of antenna assembly 20.

Looking at FIG. 3, emitting antenna 32 can alternately have a sinusoidal shaped pattern. In the example of FIG. 3, emitting antenna 32 is a dipole antenna. Emitting antenna 32 can have an axial length in a range of 0.3 to 0.5 meters. In the example of FIG. 3 uphole emitting antenna element 34 could have an axial length in a range of 0.15 to 0.25 meters and downhole emitting antenna element 36 could have an axial length in a range of 0.15 to 0.25 meters. In alternate embodiments, emitting antenna 32 can be a monopole antenna.

Receiving antenna 38 can also have a shape that is non-linear. Receiving antenna 38 can have the same shape as emitting antenna 32, such shape being a matching non-linear shape. In the example of FIG. 3, receiving antenna 38 has a sinusoidal shaped pattern. In alternate embodiments, emitting antenna 32 and receiving antenna 38 can have a triangular or saw tooth pattern. The shape of the antenna will affect the electromagnetic wavelength and the area interrogated.

In the example of FIG. 3, receiving antenna 38 is a dipole antenna. Receiving antenna 38 can have an axial length in a range of 0.3 to 0.5 meters. In the example of FIG. 2 uphole receiving antenna element 40 could have an axial length in a range of 0.15 to 0.25 meters and downhole receiving antenna element 42 could have an axial length in a range of 0.15 to 0.25 meters. In alternate embodiments, receiving antenna 38 can be a monopole antenna.

Receiving antenna 38 can receive a reflected wave. The reflective wave is an electromagnetic wave that is the result of interrogation wave that is passing through bore 16 and into subterranean formation 14 and is reflected in a direction back towards receiving antenna 38.

In the Example of FIG. 3, the interrogation wave passes through bore 16 and into subterranean formation 14. In the Example of FIG. 3, an injection fluid 48 is approaching bore 16. Systems and methods of this disclosure can be used to detect a chlorine ion concentration both in the injection fluid 48 and the regions of subterranean formation 14 outside of injection fluid 48. As an example, systems and methods of this disclosure can detect chlorine ion concentrations in the injection fluid 48 and the regions of subterranean formation 14 outside of injection fluid 48 adjacent to bore 16 and at a radial distance of more than 8 feet from an outer surface of antenna assembly 20. The chlorine ion concentration gradient can be used to identify the border between the injection fluid 48 and the regions of subterranean formation 14 outside of injection fluid 48. The chlorine ion concentration can also be used to determine the level of saturation of subterranean formation 14 outside of injection fluid 48.

Looking at FIGS. 2-3, in order to measure the chlorine ion concentration around a circumference of bore 16, motor 30 can be used to rotate antenna assembly 20 around central axis 24 of antenna body 26 within bore 16 of subterranean well 10.

In order to determine a distribution of chlorine ion concentration in subterranean formation 14, the amplitude of the reflected wave can be analyzed. The ion concentration is related to the amplitude attenuation and spacial distribution. The distribution of the chlorine ion concentration obtained from the electromagnetic wave amplitude variation is estimated by analyzing the various levels of attenuation of the reflected amplitudes of the reflected waves using an impulse interrogation method.

Some currently used measurement techniques cannot evaluate water levels beyond invaded zone 44 or identify injection fluid 48 because of the shallow depth of investigation of such current techniques. In order to correlate the measured amplitude variation to the concentration of chlorine ions and in turn, the amount of water present an initial baseline, or caliper test can be performed against which the attenuation levels will be determined. Such baseline test can be performed in a pre-defined controlled environment, such as in a laboratory before antenna assembly 20 is used in a subterranean well.

The speed of propagation and attenuation of electromagnetic waves in subterranean formation 14 depends on electrical characteristics such as conductivity ("σ"), magnetic permeability ("µ") and the dielectric constant ("ε"). Electromagnetic wave attenuation is expressed a "α" which is calculated as follows:

$$\alpha = \frac{1}{2}\left(\frac{\sigma\sqrt{\mu}}{\varepsilon}\right)$$

Because the dielectric constant "ε" does not change significantly in fresh water and salty water, the change in the ionic strength is instead linked to the change in the conductivity "σ". Any change of the chlorine ion concentration in the formation will be linked to direct changes in the values of the conductivity "σ".

The ion concentration is related to the amplitude attenuation and spacial distribution. The distribution of the chlorine ion concentration obtained from the electromagnetic wave amplitude variation are estimated from the reflected wave by analyzing the different levels of attenuation on the reflected amplitudes using the impulse interrogation method. The electromagnetic reflected wave after an impulse will have a different level of attenuation, which can be correlated to the chlorine concentration. As example, when using the impulse method a current pulse can be applied at the emitting antenna and the potential change can be measured at the receiving antenna. The analysis of the measured data can be performed using a spectral approach so that frequency response functions are obtained from the excitation and the response signals. The attenuation can then be determined from the frequency response functions.

Embodiments of this disclosure are able to differentiate between the injection water and the formation water and to measure saturation in the near wellbore region behind the kill fluid invaded zone.

Embodiments of this disclosure have been sufficiently described so that a person with ordinary skill in the art may reproduce and obtain the results mentioned in this disclosure. Nonetheless, any skilled person in the field of technique, subject of this disclosure, may carry out modifications not described in this disclosure, to apply these modifications to a determined structure, or in the manufacturing process of the same, and such resulting structures shall be covered within the scope of this disclosure.

It should be noted and understood that there can be improvements and modifications made of the present embodiments described in detail in this disclosure without departing from the scope of the disclosure.

What is claimed is:

1. A method for identifying a salinity gradient in a formation surrounding a bore of a subterranean well, the method including:
   introducing an antenna assembly into the bore of the subterranean well, the antenna assembly having:
     an elongated antenna body;
     an emitting antenna extending axially along an outer surface of the antenna body; and
     a receiving antenna extending axially along the outer surface of the antenna body, the receiving antenna being spaced circumferentially apart from the emitting antenna;
   producing an electromagnetic interrogation wave into the formation with the emitting antenna with a pulse duration of no greater than 0.1 seconds, producing the electromagnetic interrogation wave with a frequency in a range of 500 megahertz to 1 gigahertz;
   receiving a reflected wave with the receiving antenna; and
   analyzing an amplitude of the reflected wave to determine a distribution of chlorine ion concentration in the formation.

2. The method of claim 1, where the emitting antenna is printed on the outer surface of the antenna body and where the receiving antenna is printed on the outer surface of the antenna body.

3. The method of claim 1, where the emitting antenna and the receiving antenna have the same shape, and where the shape is non-linear.

4. The method of claim 1, where the emitting antenna and the receiving antenna are each dipole antenna with a matching non-linear shape.

5. The method of claim 1, where the receiving antenna is spaced circumferentially apart from the emitting antenna in a range of 30 to 45 degrees.

6. The method of claim 1, where a length of each antenna is in a range of 0.3 to 0.5 meters.

7. The method of claim 1, where the emitting antenna has a power in a range of 15 to 20 volts.

8. The method of claim 7, where the emitting antenna has a peak to peak load of 50 Ohms and a power range of 4.5 to 8 Watts.

9. The method of claim 1, further including rotating the antenna assembly around a central axis of the antenna body within the bore of the subterranean well.

10. A system for identifying a salinity gradient in a formation surrounding a bore of a subterranean well, the system including:
    an antenna assembly sized to be introduced into the bore of the subterranean well, the antenna assembly having:
      an elongated antenna body;
      an emitting antenna extending axially along an outer surface of the antenna body, the emitting antenna being operable to produce an electromagnetic interrogation wave into the formation with a pulse duration of no greater than 0.1 seconds, where the electromagnetic interrogation wave has a frequency in a range of 500 megahertz to 1 gigahertz; and
      a receiving antenna extending axially along the outer surface of the antenna body, the receiving antenna being spaced circumferentially apart from the emitting antenna and the receiving antenna being operable to receive a reflected wave, where an amplitude of the reflected wave is determinative of a distribution of chlorine ion concentration in the formation.

11. The system of claim 10, where the emitting antenna is printed on the outer surface of the antenna body and where the receiving antenna is printed on the outer surface of the antenna body.

12. The system of claim 10, where the emitting antenna and the receiving antenna have the same shape, and where the shape is non-linear.

13. The system of claim 10, where the emitting antenna and the receiving antenna are each dipole antenna with a matching non-linear shape.

14. The system of claim 10, where the receiving antenna is spaced circumferentially apart from the emitting antenna in a range of 30 to 45 degrees.

15. The system of claim 10, where a length of each antenna is in a range of 0.3 to 0.5 meters.

16. The system of claim 10, where the emitting antenna has a power in a range of 15 to 20 volts.

17. The system of claim 16, where the emitting antenna has a peak to peak load of 50 Ohms and a power range of 4.5 to 8 Watts.

18. The system of claim 10, further including a motor operable to rotate the antenna assembly around a central axis of the antenna body within the bore of the subterranean well.

19. A method for identifying a salinity gradient in a formation surrounding a bore of a subterranean well, the method including:
    introducing an antenna assembly into the bore of the subterranean well, the antenna assembly having:
      an elongated antenna body;
      an emitting antenna extending axially along an outer surface of the antenna body; and
      a receiving antenna extending axially along the outer surface of the antenna body, the receiving antenna being spaced circumferentially apart from the emitting antenna, where the emitting antenna and the receiving antenna have the same shape, and where the shape is non-linear;
    producing an electromagnetic interrogation wave into the formation with the emitting antenna with a pulse duration of no greater than 0.1 seconds;

receiving a reflected wave with the receiving antenna; and
analyzing an amplitude of the reflected wave to determine a distribution of chlorine ion concentration in the formation.

20. A method for identifying a salinity gradient in a formation surrounding a bore of a subterranean well, the method including:
  introducing an antenna assembly into the bore of the subterranean well, the antenna assembly having:
    an elongated antenna body;
    an emitting antenna extending axially along an outer surface of the antenna body; and
    a receiving antenna extending axially along the outer surface of the antenna body, the receiving antenna being spaced circumferentially apart from the emitting antenna, where the receiving antenna is spaced circumferentially apart from the emitting antenna in a range of 30 to 45 degrees;
  producing an electromagnetic interrogation wave into the formation with the emitting antenna with a pulse duration of no greater than 0.1 seconds;
  receiving a reflected wave with the receiving antenna; and
  analyzing an amplitude of the reflected wave to determine a distribution of chlorine ion concentration in the formation.

21. A method for identifying a salinity gradient in a formation surrounding a bore of a subterranean well, the method including:
  introducing an antenna assembly into the bore of the subterranean well, the antenna assembly having:
    an elongated antenna body;
    an emitting antenna extending axially along an outer surface of the antenna body; and
    a receiving antenna extending axially along the outer surface of the antenna body, the receiving antenna being spaced circumferentially apart from the emitting antenna, where a length of each antenna is in a range of 0.3 to 0.5 meters;
  producing an electromagnetic interrogation wave into the formation with the emitting antenna with a pulse duration of no greater than 0.1 seconds;
  receiving a reflected wave with the receiving antenna; and
  analyzing an amplitude of the reflected wave to determine a distribution of chlorine ion concentration in the formation.

22. A method for identifying a salinity gradient in a formation surrounding a bore of a subterranean well, the method including:
  introducing an antenna assembly into the bore of the subterranean well, the antenna assembly having:
    an elongated antenna body;
    an emitting antenna extending axially along an outer surface of the antenna body, where the emitting antenna has a power in a range of 15 to 20 volts; and
    a receiving antenna extending axially along the outer surface of the antenna body, the receiving antenna being spaced circumferentially apart from the emitting antenna;
  producing an electromagnetic interrogation wave into the formation with the emitting antenna with a pulse duration of no greater than 0.1 seconds;
  receiving a reflected wave with the receiving antenna; and
  analyzing an amplitude of the reflected wave to determine a distribution of chlorine ion concentration in the formation.

23. A system for identifying a salinity gradient in a formation surrounding a bore of a subterranean well, the system including:
  an antenna assembly sized to be introduced into the bore of the subterranean well, the antenna assembly having:
    an elongated antenna body;
    an emitting antenna extending axially along an outer surface of the antenna body, the emitting antenna being operable to produce an electromagnetic interrogation wave into the formation with a pulse duration of no greater than 0.1 seconds; and
    a receiving antenna extending axially along the outer surface of the antenna body, the receiving antenna being spaced circumferentially apart from the emitting antenna, where the emitting antenna and the receiving antenna have the same shape, and where the shape is non-linear, and the receiving antenna being operable to receive a reflected wave, where an amplitude of the reflected wave is determinative of a distribution of chlorine ion concentration in the formation.

24. A system for identifying a salinity gradient in a formation surrounding a bore of a subterranean well, the system including:
  an antenna assembly sized to be introduced into the bore of the subterranean well, the antenna assembly having:
    an elongated antenna body;
    an emitting antenna extending axially along an outer surface of the antenna body, the emitting antenna being operable to produce an electromagnetic interrogation wave into the formation with a pulse duration of no greater than 0.1 seconds; and
    a receiving antenna extending axially along the outer surface of the antenna body, the receiving antenna being spaced circumferentially apart from the emitting antenna in a range of 30 to 45 degrees and the receiving antenna being operable to receive a reflected wave, where an amplitude of the reflected wave is determinative of a distribution of chlorine ion concentration in the formation.

25. A system for identifying a salinity gradient in a formation surrounding a bore of a subterranean well, the system including:
  an antenna assembly sized to be introduced into the bore of the subterranean well, the antenna assembly having:
    an elongated antenna body;
    an emitting antenna extending axially along an outer surface of the antenna body, the emitting antenna being operable to produce an electromagnetic interrogation wave into the formation with a pulse duration of no greater than 0.1 seconds; and
    a receiving antenna extending axially along the outer surface of the antenna body, the receiving antenna being spaced circumferentially apart from the emitting antenna, where a length of each antenna is in a range of 0.3 to 0.5 meters, and the receiving antenna being operable to receive a reflected wave, where an amplitude of the reflected wave is determinative of a distribution of chlorine ion concentration in the formation.

26. A system for identifying a salinity gradient in a formation surrounding a bore of a subterranean well, the system including:
  an antenna assembly sized to be introduced into the bore of the subterranean well, the antenna assembly having:
    an elongated antenna body;

an emitting antenna extending axially along an outer surface of the antenna body, the emitting antenna being operable to produce an electromagnetic interrogation wave into the formation with a pulse duration of no greater than 0.1 seconds, where the emitting antenna has a power in a range of 15 to 20 volts; and a receiving antenna extending axially along the outer surface of the antenna body, the receiving antenna being spaced circumferentially apart from the emitting antenna and the receiving antenna being operable to receive a reflected wave, where an amplitude of the reflected wave is determinative of a distribution of chlorine ion concentration in the formation.

* * * * *